(12) United States Patent
Lin et al.

(10) Patent No.: US 9,033,588 B2
(45) Date of Patent: May 19, 2015

(54) ONE-PIECE OPTICAL FIBER ADAPTER

(75) Inventors: Sung-An Lin, Miaoli County (TW); Sung-Chi Lin, Miaoli County (TW)

(73) Assignee: EZONTEK TECHNOLOGIES CO., LTD., New Taipei (TW)

( * ) Notice: Subject to any disclaimer, the term of this patent is extended or adjusted under 35 U.S.C. 154(b) by 332 days.

(21) Appl. No.: 13/563,860

(22) Filed: Aug. 1, 2012

(65) Prior Publication Data

US 2013/0302004 A1 Nov. 14, 2013

(30) Foreign Application Priority Data

May 9, 2012 (CN) .......................... 2012 1 0143549

(51) Int. Cl.
*G02B 6/38* (2006.01)
(52) U.S. Cl.
CPC .......... *G02B 6/3825* (2013.01); *Y10T 29/49826* (2015.01); *G02B 6/3885* (2013.01); *G02B 6/3893* (2013.01)

(58) Field of Classification Search
None
See application file for complete search history.

(56) References Cited

U.S. PATENT DOCUMENTS

2003/0169974 A1 9/2003 Ngo

*Primary Examiner* — Michelle R Connelly
*Assistant Examiner* — Chad Smith
(74) *Attorney, Agent, or Firm* — Lowe Hauptman & Ham, LLP

(57) ABSTRACT

The present disclosure provides a one-piece optical fiber adapter that includes a main body and a hook member. At least one first stop block is positioned on the first wall and at least one second stop block is positioned on the third wall. Two first hooks extend respectively from the second and fourth walls toward a direction of the second opening of the accommodation room. The hook member is positioned within the accommodation room of the main body and includes two second hooks, at least one third hook and at least one fourth hook. The third and fourth hooks extend respectively from the fifth and seventh walls toward a direction of the fourth opening of the accommodation room of the hook member to hook on to the first and second stop blocks, respectively.

10 Claims, 7 Drawing Sheets ical fiber adapter of the present disclosure. The main body 310 is substantially rectangular and has an accommodation room 315 defined by a top side-wall 311, a bottom side-wall 312, a right side-wall 313 and a left side-wall 314, wherein the top side-wall 311 faces the bottom side-wall 312 and connects with the right side-wall 313 and left side-wall 314. The accommodation room 315 has opposing first opening 317 and second

ONE-PIECE OPTICAL FIBER ADAPTER

CROSS REFERENCE TO RELATED APPLICATION

This application claims the priority benefit of China Patent Application Serial Number 201210143549.7 filed May 9, 2012, the full disclosure of which is incorporated herein by reference.

BACKGROUND OF THE INVENTION

1. Field of the Invention

The present invention relates to an optical fiber adapter, and more particularly, to a one-piece optical fiber adapter.

2. Description of the Related Art

Fiber optics has revolutionized communication through out the world. With the increased used of fiber optics it has become increasingly important to be able to connect and disconnect fiber optic cables from various sources. Two fiber optic cables can be optically coupled so that they are in communication with each other by using connectors and an adapter, thereby putting each fiber optic cable in communication with the other. The connectors are placed on the end of each cable and then plugged into the adapter. The adapter has two openings each one designed to receive a connector.

However, single-fiber connectors are somewhat bulky for high density application. Therefore, some types of multi-fiber connectors are provided for solving such problems.

Referring to FIG. 1, it illustrates conventional MPO type multi-fiber connectors 110, 110' and the corresponding optical fiber adapter 160 thereof. The connector 110 has guide pins 112 protruding from the front end thereof and the connector 110' has corresponding holes 112' located on the front end thereof. When the connectors 110, 110' couple with each other through the adapter 160, the guide pins 112 will be inserted into the holes 112' and the hooks 162 in the adapter 160 will hook on two recesses 114 of the connector 110 and two recesses 114' of the connector 110', respectively. At this time, the ferrule 118 of the connector 110 will be brought into contact with the ferrule 118' of the connector 110'.

Referring to FIG. 2, the conventional adapter 160 typically consists of two halves 164 of an outer housing. Each half 164 of the outer housing consists of generally of a rectangular cylinder having a flange 166 at one end. Inside each half 164 of the outer housing would be placed half 168 of an inner housing. Once the inner housing is inserted into each half 164 of the outer housing, the two halves 164 of the outer housing are connected by ultrasonically welding the two flanges 166 of the halves 164 of the outer housing.

Because the two halves 164 are ultrasonically welded together, a welding line is present on the optical fiber adapter 160. Furthermore, the optical fiber adapter 160 has more parts and therefore is time-consuming to assemble.

Accordingly, there exists a need to provide a solution to solve the aforesaid problems.

SUMMARY OF THE INVENTION

The present disclosure provides an optical fiber adapter that has fewer parts and is simpler and easier to assemble.

In one embodiment, the optical fiber adapter of the present disclosure includes a main body and a hook member. The main body has an accommodation room defined by a first wall, a second wall, a third wall and a fourth wall, the first wall facing the third wall and connecting with the second and fourth walls, wherein the accommodation room has opposing first and second openings in an axial direction. At least one first stop block is positioned on the first wall and at least one second stop block is positioned on the third wall. Two first hooks extend respectively from the second and fourth walls toward a direction of the second opening of the accommodation room, wherein the first hooks are configured to hook on to an optical fiber connector. The hook member is positioned within the accommodation room and has an accommodation room defined by a fifth wall, a sixth wall, a seventh wall and an eighth wall, the fifth wall facing the seventh wall and connecting with the sixth and eighth walls, wherein the accommodation room of the hook member has opposing third and fourth openings in the axial direction. The hook member further includes two second hooks, at least one third hook and at least one fourth hook. The second hooks extend respectively from the sixth and eighth walls toward a direction of the third opening of the accommodation room of the hook member, wherein the second hooks are configured to hook on to an optical fiber connector. The third hook extends from the fifth wall toward a direction of the fourth opening of the accommodation room of the hook member, wherein the third hook is configured to hook on to the first stop block. The fourth hook extends from the seventh wall toward the direction of the fourth opening of the accommodation room of the hook member, wherein the fourth hook is configured to hook on to the second stop block.

The present disclosure further provides a method of assembling the above optical fiber adapter. The hook member is inserted into the accommodation room of the main body through the first opening. The third and fourth hooks is slid on the first and second stop blocks, respectively.

The foregoing, as well as additional objects, features and advantages of the disclosure will be more readily apparent from the following detailed description, which proceeds with reference to the accompanying drawings.

DETAILED DESCRIPTION OF THE PREFERRED EMBODIMENT

Figure 3A:
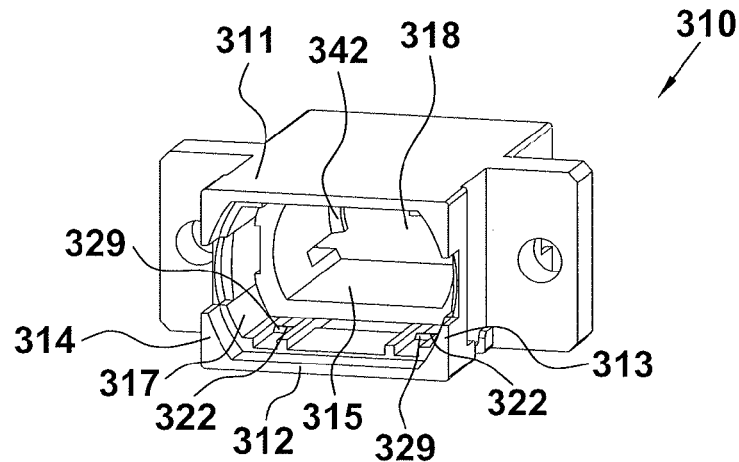
FIGS. 3a to 3c are different perspective views of the main body of the optical fiber adapter of the present disclosure.
Figure 3B:
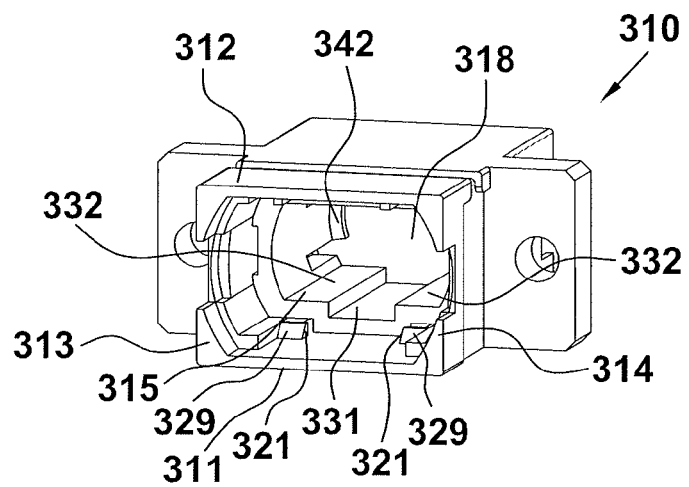
Figure 3C:
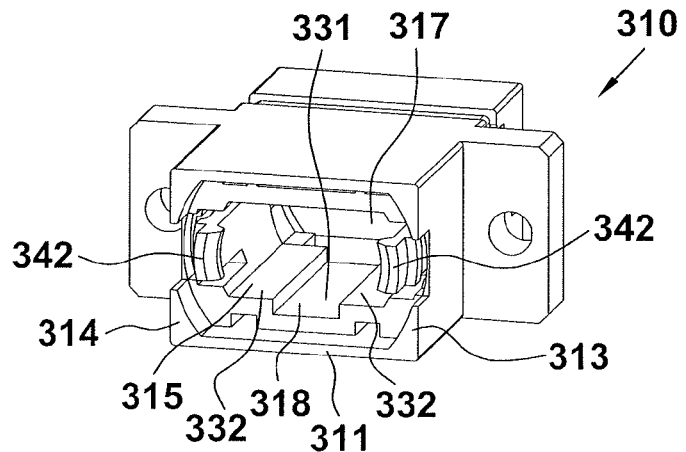

Referring to FIGS. 3a to 3c, the MPO type optical fiber adapter according to the present disclosure includes a unitary molded plastic main body 310. The main body 310 is substantially rectangular and has an accommodation room 315 defined by a top side-wall 311, a bottom side-wall 312, a right side-wall 313 and a left side-wall 314, wherein the top side-wall 311 faces the bottom side-wall 312 and connects with the right side-wall 313 and left side-wall 314. The accommodation room 315 has opposing first opening 317 and second opening 318 in an axial direction through which an optical fiber connector may be inserted into the accommodation room 315. At least one stop block 322, for example two stop blocks 322 are positioned on the bottom side-wall 312, and at least one stop block 321, for example two stop blocks 321 are positioned on the top side-wall 311. Each of the stop blocks 321, 322 has a narrow top surface, a wide bottom surface, an inclined side surface 329 facing the first opening 317 of the accommodation room 315, and a vertical side surface facing the second opening 318 of the accommodation room 315. Two parallel protrusions 332 are formed on the top side-wall 311 and near the second opening 318. Therefore, an indentation 331 is formed between the protrusions 332, wherein the indentation 331 has a width slightly greater than the width of the protrusion 117' on the optical fiber connector 110' of the FIG. 1. In addition, a hook 342 is formed on each of the right and left side-walls 313, 314. The two hooks 342 are positioned to face each other and extend toward the second opening 318. In one embodiment, the hooks 342 are integrally formed with the right and left side-walls 313, 314, respectively.

Figure 4A:
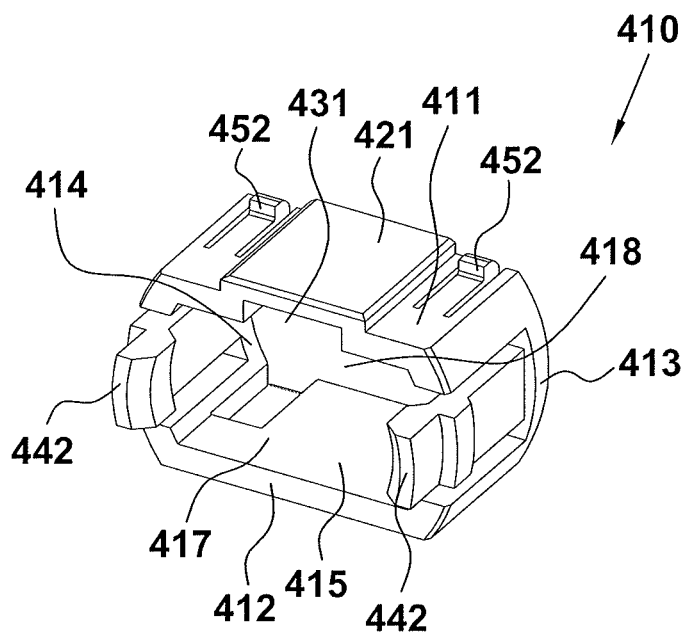
FIGS. 4a and 4b are different perspective views of the hook member of the optical fiber adapter of the present disclosure.
Figure 4B:
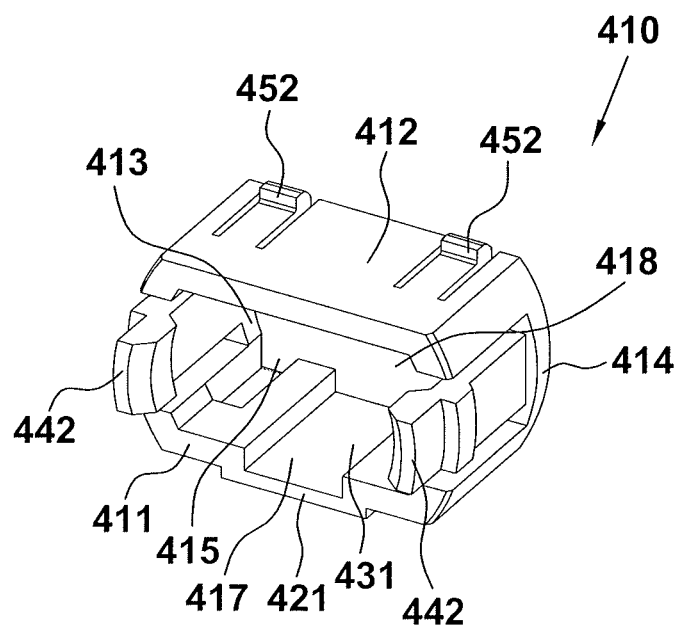

Referring to FIGS. 4a and 4b, the optical fiber adapter of the present disclosure further includes a unitary molded plastic hook member 410. The hook member 410 has an accommodation room 415 defined by a top side-wall 411, a bottom side-wall 412, a right side-wall 413 and a left side-wall 414, wherein the top side-wall 411 faces the bottom side-wall 412 and connects with the right side-wall 413 and left side-wall 414. The accommodation room 415 has opposing first opening 417 and second opening 418 in an axial direction. A hook 442 is formed on each of the right and left side-walls 413, 414. The two hooks 442 are positioned to face each other and extend toward the first opening 417. A rectangular protrusion 421 is formed on the top side-wall 411 and outside the accommodation room 415. A rectangular indentation 431 is formed on the top side-wall 411 and inside the accommodation room 415, wherein the indentation 431 has a width slightly greater than the width of the protrusion 117' on the optical fiber connector 110' of the FIG. 1. In addition, at least one elastic hook 452, for example two hooks 452 are formed on each of the top and bottom side-walls 411, 412. The hooks 452 are positioned to extend toward the second opening 418.

Figure 5:
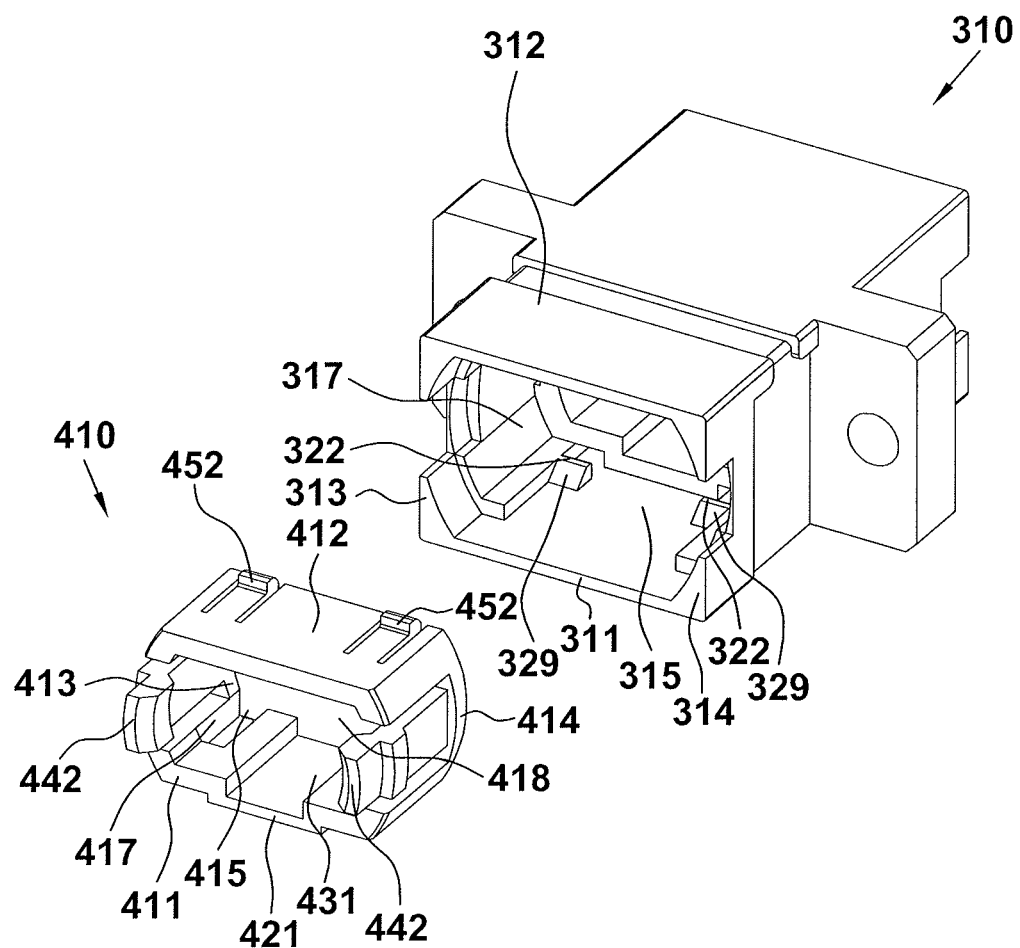
FIG. 5 illustrates the main body and hook member of the optical fiber adapter according to the present disclosure.
Figure 6:
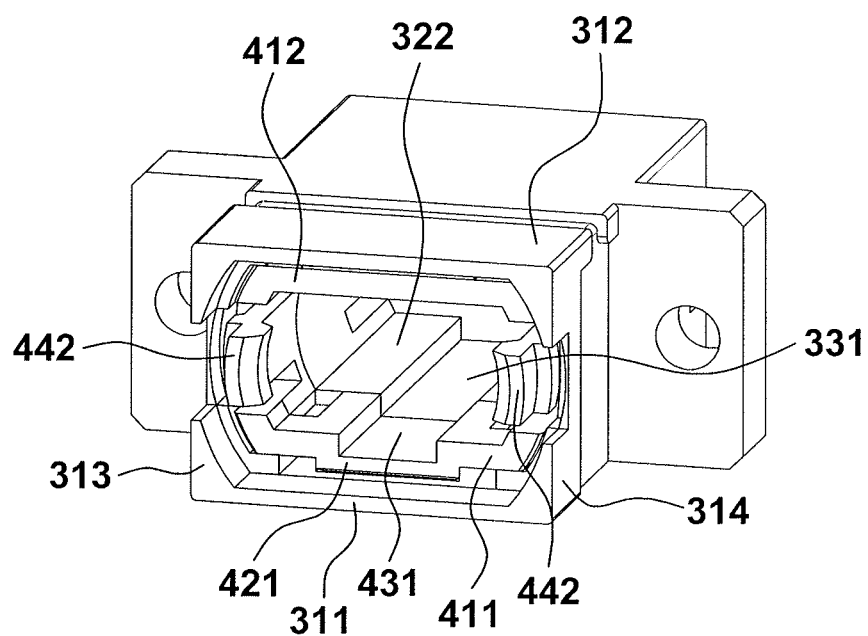
FIG. 6 is an exploded view of the optical fiber adapter according to one embodiment of the present disclosure.
Figure 7:
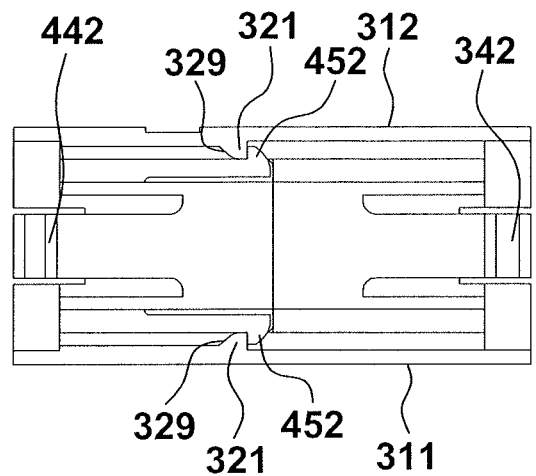
FIG. 7 is a cross-sectional view of the optical fiber adapter of the present disclosure.

Referring to FIG. 5, when desiring to assemble the optical fiber adapter of the present disclosure, the hook member 410 is inserted into the accommodation room 315 through the first opening 317. When the hook member 410 continues to be pushed into the accommodation room 315, the hooks 452 on the top and bottom side-walls 411, 412 will first meet the stop blocks 321, 322, respectively. Since the hooks 452 are elastic, the hooks 452 will be pressed to be deformed by the stop blocks 321, 322 respectively and slide on the inclined side surface 392 of the stop blocks 321, 322, respectively when the hook member 410 is pushed into the accommodation room 315. FIG. 6 is an elevated perspective view illustrating that the hook member 410 is positioned in the main body 310. Referring to FIG. 7, after the hooks 452 have passed the stop blocks 321, 322, the hooks 452 will hook on to the vertical side surfaces of the stop blocks 321, 322 respectively when a pull force is exerted on the hook member 410. Therefore, this arrangement may prevent the hook member 410 from being pulled out of the accommodation room 315 through the first opening 317.

Figure 8:
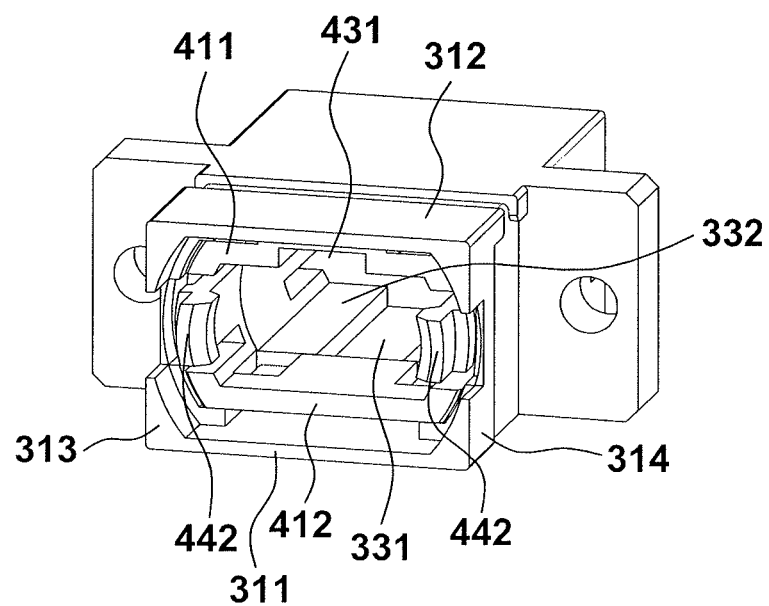
FIG. 8 is an exploded view of the optical fiber adapter according to another embodiment of the present disclosure.

It should be appreciated the hook member 410 may be positioned in the main body 310 in such a manner that the indentation 431 is positioned to be in communication with the indentation 331 on the top side-wall 311 of the main body 310. This can be seen in FIG. 6. Alternatively, the indentation 431 may be positioned opposite to the indentation 331 when the hook member 410 is placed in the main body 310. This arrangement is shown in FIG. 8.

Figure 1:
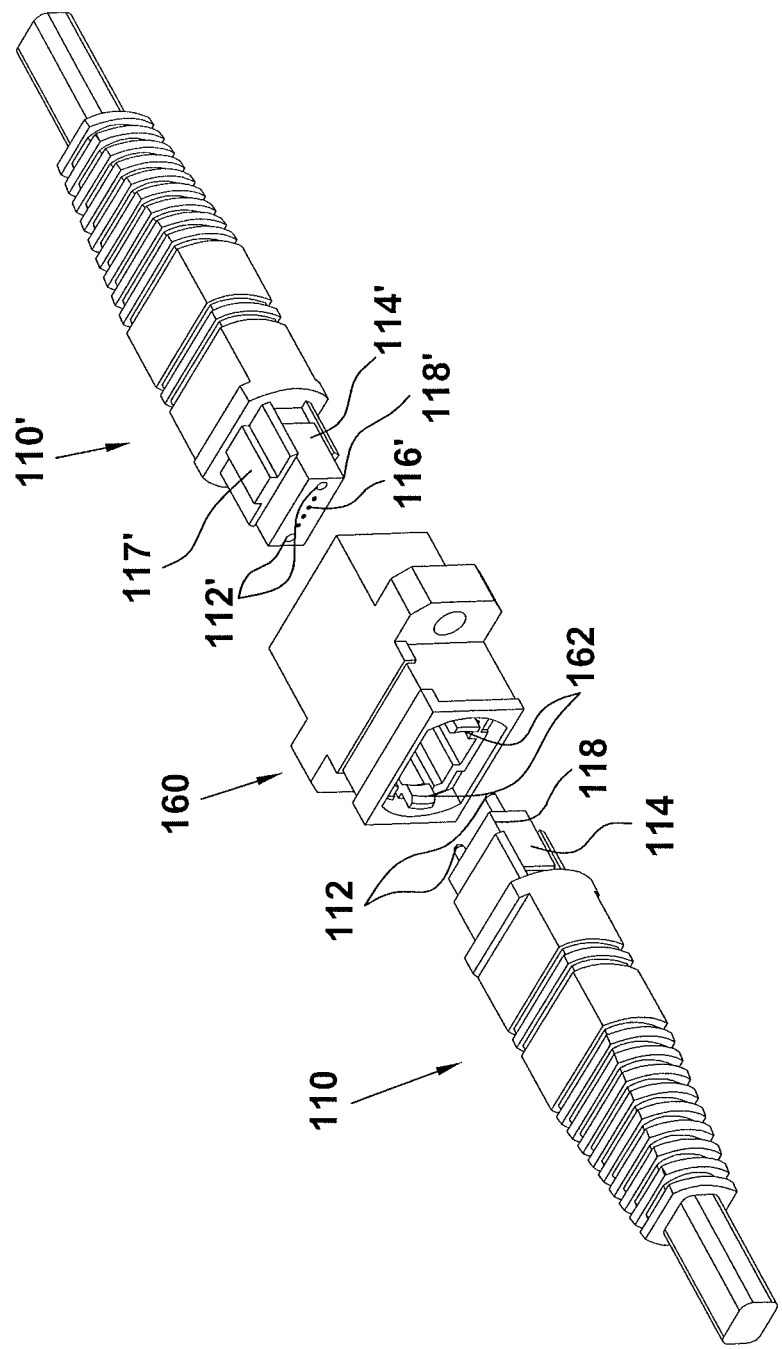
FIG. 1 is an elevated perspective view of a conventional MPO type optical fiber connector and adapter.
Figure 2:
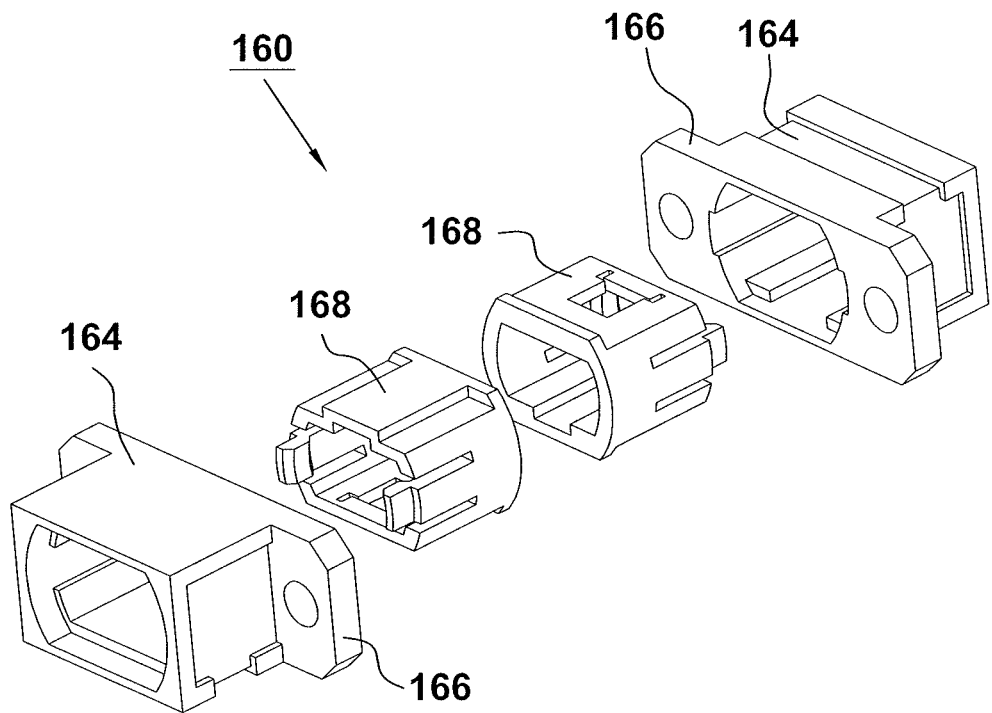
FIG. 2 is an exploded view of a conventional MPO type optical fiber adapter.

In operation, the MPO type optical fiber connectors 110 and 110' of FIG. 1 are inserted into the accommodation rooms 315 of the main body 310 through the first and second openings 317, 318, respectively. When the optical fiber connectors 110, 110' are fully inserted into the main body 310, the protrusions 117' on the optical fiber connectors 110 and 110' will be positioned in the indentation 431 on the hook member 410 and the indentation 331 on the top side-wall 311, respectively. In addition, the hooks 442, 342 will hook on to the recesses 114, 114' of the connectors 110 and 110' respectively. The guide pins 112 of the connector 110 are inserted into the guide holes 112' of the connector 110' and the ferrule 118 of the connector 110 is also brought into contact with the ferrule 118' of the connector 110'.

According to the optical fiber adapter of the present disclosure, the prior art problem that the stresses cause the two halves of the adapter to separate from each other after time can be solved since the main body 310 is unitary, Although the preferred embodiments of the disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. An optical fiber adapter, comprising:
   a main body having an accommodation room defined by a first wall, a second wall, a third wall and a fourth wall, the first wall facing the third wall and connecting with the second and fourth walls, wherein the accommodation room has opposing first and second openings in an axial direction;
   at least one first stop block protruding from the first wall;
   at least one second stop block protruding from the third wall;
   two first hooks extending respectively from the second and fourth walls toward a direction of the second opening of the accommodation room, wherein the first hooks are configured to hook on to an optical fiber connector; and
   a hook member positioned within the accommodation room, the hook member having an accommodation room defined by a fifth wall, a sixth wall, a seventh wall and an eighth wall, the fifth wall facing the seventh wall and connecting with the sixth and eighth walls, wherein the accommodation room of the hook member has opposing third and fourth openings in the axial direction, the hook member further comprising:
      two second hooks extending respectively from the sixth and eighth walls toward a direction of the third opening of the accommodation room of the hook member, wherein the second hooks are configured to hook on to another optical fiber connector;
      at least one third hook extending from the fifth wall toward a direction of the fourth opening of the accommodation room of the hook member, wherein the third hook is configured to hook on to the first stop block; and
      at least one fourth hook extending from the seventh wall toward the direction of the fourth opening of the accommodation room of the hook member, wherein the fourth hook is configured to hook on to the second stop block.

2. The optical fiber adapter as claimed in claim 1, wherein each of the first and second stop blocks has an inclined side surface facing the first opening of the accommodation room of the main body, and the third and fourth hooks are slidable on the inclined side surfaces of the first and second stop blocks, respectively.

3. The optical fiber adapter as claimed in claim 1, wherein the first hooks are integrally formed with the second and fourth walls.

4. The optical fiber adapter as claimed in claim 2, wherein the third and fourth hooks are elastic.

5. The optical fiber adapter as claimed in claim 1, wherein the optical fiber adapter is MPO type.

6. A method of assembling an optical fiber adapter, comprising:
   providing a main body having an accommodation room defined by a first wall, a second wall, a third wall and a fourth wall, the first wall facing the third wall and connecting with the second and fourth walls, the accommodation room having opposing first and second openings in an axial direction, wherein at least one first stop block and at least one second stop block protrude from the first and third walls, respectively, two first hooks extend respectively from the second and fourth walls toward a direction of the second opening of the accommodation room;
   providing a hook member having an accommodation room defined by a fifth wall, a sixth wall, a seventh wall and an eighth wall, the fifth wall facing the seventh wall and connecting with the sixth and eighth walls, the accommodation room of the hook member having opposing third and fourth openings in the axial direction, wherein two second hooks extend respectively from the sixth and eighth walls toward a direction of the third opening of the accommodation room of the hook member, at least one third hook and at least one fourth hook extend respectively from the fifth and seventh walls toward a direction of the fourth opening of the accommodation room of the hook member;
   inserting the hook member into the accommodation room of the main body through the first opening; and
   sliding the third and fourth hooks on the first and second stop blocks, respectively.

7. The method as claimed in claim 6, wherein each of the first and second stop blocks has an inclined side surface facing the first opening of the accommodation room of the main body, the third and fourth hooks slide on the inclined side surfaces of the first and second stop blocks, respectively.

8. The method as claimed in claim 6, wherein the first hooks are integrally formed with the second and fourth walls.

9. The method as claimed in claim 7, wherein the third and fourth hooks are elastic.

10. The method as claimed in claim 6, wherein the optical fiber adapter is MPO type.

* * * * *